United States Patent [19]

Lazzouni et al.

[11] Patent Number: 5,661,506

[45] Date of Patent: Aug. 26, 1997

[54] PEN AND PAPER INFORMATION RECORDING SYSTEM USING AN IMAGING PEN

[75] Inventors: Mohamed Lazzouni, Worcester; Mohamed Yousaf, Shrewsbury; Rizwan A. Qureshi, Worcester; Naveed A. Nazir, Shrewsbury, all of Mass.

[73] Assignee: SIA Technology Corporation, Southboro, Mass.

[21] Appl. No.: 338,025

[22] Filed: Nov. 10, 1994

[51] Int. Cl.[6] .................................................. G09G 5/00
[52] U.S. Cl. .......................................... 345/179; 178/18
[58] Field of Search .................................. 345/179, 180, 345/181, 182, 183, 173, 175; 178/18, 19; 341/13, 20

[56] References Cited

U.S. PATENT DOCUMENTS

| | | | |
|---|---|---|---|
| 3,735,350 | 5/1973 | Lemelson | 340/146.3 |
| 3,918,029 | 11/1975 | Lemelson | 340/146.3 |
| 4,420,682 | 12/1983 | Huber | 235/472 |
| 4,445,028 | 4/1984 | Huber | 235/472 |
| 4,448,837 | 5/1984 | Ikeda et al. | 428/215 |
| 4,467,196 | 8/1984 | Balliet et al. | 250/227 |
| 4,639,070 | 1/1987 | Ikeda et al. | 350/3.71 |
| 4,668,858 | 5/1987 | Heuwieser et al. | 235/472 |
| 4,682,016 | 7/1987 | Inoue | 235/462 |
| 4,688,933 | 8/1987 | Lapeyre | 356/1 |
| 4,723,836 | 2/1988 | Kono et al. | 350/331 R |
| 4,728,784 | 3/1988 | Stewart | 235/462 |
| 4,731,526 | 3/1988 | Knoll et al. | 235/472 |
| 4,766,404 | 8/1988 | Ishida et al. | 355/7 |
| 4,794,634 | 12/1988 | Torihata et al. | 379/96 |
| 4,814,760 | 3/1989 | Johnston et al. | 340/784 |
| 4,818,851 | 4/1989 | Kimura | 235/472 |
| 4,839,634 | 6/1989 | More et al. | 340/712 |
| 4,856,077 | 8/1989 | Rothfjell | 382/3 |
| 4,860,372 | 8/1989 | Kuzunuki et al. | 382/13 |
| 4,877,949 | 10/1989 | Danielson et al. | 235/462 |
| 4,936,683 | 6/1990 | Purcell | 356/152 |
| 4,947,156 | 8/1990 | Sato et al. | 340/707 |
| 4,959,805 | 9/1990 | Ohouchi et al. | 364/562 |
| 4,977,315 | 12/1990 | Purcell | 250/221 |
| 5,012,049 | 4/1991 | Schier | 178/19 |
| 5,017,913 | 5/1991 | Kaneko et al. | 340/712 |
| 5,038,024 | 8/1991 | Chadima, Jr. et al. | 235/472 |
| 5,047,617 | 9/1991 | Shepard et al. | 235/467 |
| 5,051,736 | 9/1991 | Bennett et al. | 340/707 |
| 5,099,109 | 3/1992 | Ishikawa et al. | 235/462 |
| 5,214,426 | 5/1993 | Minohara et al. | |
| 5,477,012 | 12/1995 | Sekendur | 178/18 |

FOREIGN PATENT DOCUMENTS 2423522  11/1979  France .

*Primary Examiner*—Regina D. Liang
*Attorney, Agent, or Firm*—Wolf, Greenfield & Sacks, P.C.

[57] ABSTRACT

An information recording system includes a writing paper having a writing surface and a prerecorded invisible pattern of pixels associated with the writing surface. Each of the pixels contains encoded, optically readable position information which identifies a coordinate position on the writing surface. The system includes a pen, having an instrument for writing on the writing surface, and an imaging system for providing image signals representative of images of the pixels near the pen tip when the tip is in contact with the surface. The system further includes a recording/processing unit coupled to the pen. The recording/processing unit includes a processor responsive to the image signals for determining and electronically recording the positions of the pen tip on the writing surface as the markings are made on the writing surface, so that the recording/processing unit contains an electronic representation of the markings on the writing surface.

7 Claims, 12 Drawing Sheets

PEN AND PAPER INFORMATION RECORDING SYSTEM USING AN IMAGING PEN

FIELD OF THE INVENTION

This invention relates to data input devices and, more particularly, to a system for recording information in a memory simultaneously with writing on encoded paper.

BACKGROUND OF THE INVENTION

Two-dimensional input devices for inputting handwritten data and text, sketching and drawing into a host computer are relatively well known. Most of these applications require the transfer, in real time, of a pen or stylus position on a tablet to a host computer for storage, processing or display. In these applications, it is desirable to have both a handwritten record of the activity and a record in a memory. It is also desirable to perform these functions without the need for a host computer, thus permitting portable and field use of the input device.

Currently available pen-based computer systems are self contained and utilize a central processing unit and an operating system. An active tablet or a passive tablet is a peripheral device to a host computer, which records coordinate position information. All known systems have serious limitations.

Currently available active tablets can be functionally classified as inductive, transparent digitizing, resistive, acoustic, laser scanning and the like. These tablets have deficiencies in resolution, accuracy, robustness, cost, uniform resistivity, drift, size, weight, reliability, and the like. For example, inductive tablets have problems with electrical noise and field distortion from nearby metallic objects. These tablets must be attached to a host computer which limits portable and field use.

Prior art passive tablets typically fall into two categories. The first category is the well known mouse device which uses a surface to enter relative positional data into a system. The second category normally utilizes a stylus pickup device, which provides relative or absolute position as the moving stylus is passed over a tablet surface containing grid lines in the X and Y directions. Current systems of the second category suffer from lack of resolution for applications such as handwriting and graphical drawing.

Prior art encoded paper using bars of printed lines generally falls into two classes. In the first class, bars are placed adjacent to each other at spaced regular or irregular intervals, are aligned vertically and are sequenced in one direction. Methods for reading encoded information from conventional bar codes and for decoding the bar code information are known in the art. This technique is used for inventory identification, pricing, adding the prices of goods and other applications. The bar code reader includes a light source for illuminating the elements of the bar code. Reflected light is directed with a series of optical elements onto an image photosensor.

U.S. Pat. No. 4,731,526 issued Mar. 15, 1988 to Knoll et al discloses a technique for determining navigation data from a map. A line code grid is imprinted on the map or on a separate foil. The line code includes vertical and horizontal lines that may differ as to width, distance, color, and the like. Fluorescing and phosphorescing inks are suggested. Infrared absorbing or reflecting substances are also disclosed. The line code is used to determine the position on a map using a light pen. In addition, the line code can be implemented as raised portions which are mechanically sensed.

Handwriting input techniques are disclosed in U.S. Pat. No. 4,947,156 issued Aug. 7, 1990 to Sato et al; U.S. Pat. No. 5,051,736 issued Sept. 24, 1991 to Bennett et al; U.S. Pat. No. 4,839,634 issued Jun. 13, 1989 to More et al; U.S. Pat. No. 4,856,077 issued Aug. 8, 1989 to Rothfjell; U.S. Pat. No. 4,814,760 issued Mar. 21, 1989 to Johnston et al; U.S. Pat. No. 4,860,372 issued Aug. 22, 1989 to Kuzunuki et al; U.S. Pat. No. 4,794,634 issued Dec. 27, 1988 to Torihata et al; U.S. Pat. No. 4,723,836 issued Feb. 9, 1988 to Kono et al and U.S. Pat. No. 4,448,837 issued May 15, 1984 to Ikeda et al.

French Patent No. 2,423,522 discloses information on fluorescent markings in the near infrared. The French patent discloses an ink, consisting of pigments from the rare earth group, which absorbs or emits in the infrared. These inks are designed for indexing documents such as envelopes, postal checks, tickets and similar applications.

It is a general object of the present invention to provide methods and apparatus for reading and storing coordinate information representative of the instantaneous position of a pen on a writing surface.

It is another object of the present invention to provide a writing paper having a prerecorded pattern of pixels, each pixel containing encoded location information which identifies an absolute and unique coordinate location on the paper.

It is a further object of the present invention to provide an information input system for simultaneously recording written information on encoded paper and recording the written information in a memory.

It is a further object of the present invention to provide a pen and paper information recording system which has high resolution, is accurate, reliable and low in cost, and allows multiple users to use several pens on one paper.

SUMMARY OF THE INVENTION

According to the present invention, these and other objects are achieved in information recording apparatus for use with paper having a prerecorded pattern of pixels associated with a writing surface. Each of the pixels contains encoded, optically readable position information which is invisible to the human eye and which identifies an absolute coordinate position on the writing surface. The information recording apparatus comprises a pen having means including a writing tip for making visible markings on the writing surface of the paper. The information recording apparatus also includes image means for providing image signals representative of images of the pixels near the writing tip when the tip is in contact with the surface. The visible markings do not hinder or deteriorate the encoded position information or the imaging process. The apparatus further includes a recording/processing unit coupled to the pen. The recording/processing unit includes processing means responsive to the image signals provided by the image means for determining and electronically recording the positions of the writing tip on the writing surface as the visible markings are made on the writing surface, so that the recording/processing unit contains an electronic representation of the visible markings on the writing surface.

Preferably, the recording/processing unit includes a portable housing separate from the pen. The means for making visible markings preferably includes a fountain pen or other writing instrument having a fountain pen configuration.

The image means preferably includes a video camera and means for directing a light beam to the pixels near the writing tip. The light beam produces reflected light from the writing surface that is received by the video camera. The light beam includes radiation in the infrared wavelength range and in particular is matched to the absorption wavelength of the encoded position information in the pixels. The means for directing a light beam may include a light source mounted in the pen, or a light source located in the recording unit and coupled to the pen by one or more optical fibers. The video camera may be mounted in the pen, or may be located in the recording/processing unit and coupled to the pen by a coherent optical fiber bundle.

According to another aspect of the invention, a writing sheet comprises a writing surface and a prerecorded pattern of pixels associated with the writing surface. Each of the pixels contains encoded, optically readable position information which identifies an absolute coordinate position of the pixel on the writing surface. The pixel comprises a first plurality of bit locations for encoding an X-coordinate of the pixel, a second plurality of bit locations for encoding a Y-coordinate of the pixel, a third plurality of bit locations for indicating the orientation of the pixel, and a homing feature for indicating the position of the pixel relative to other pixels. Each of the bit locations contains an optically readable binary bit that is invisible to the human eye.

Preferably, the bit positions of each pixel are arranged in a matrix of rows and columns and comprise spaced-apart squares. The third plurality of bit locations may comprise four bit locations disposed at respective corners of the pixel. The pixel may further include a fourth plurality of bit locations for encoding a page number of the writing sheet. The homing feature is preferably disposed at the center of the pixel and is larger than all the other bit locations. Each of the optically readable binary bits is preferably defined by the presence or absence of infrared ink.

BRIEF DESCRIPTION OF THE DRAWINGS

For a better understanding of the present invention together with other further objects, advantages and capabilities thereof, reference is made to the accompanying drawings which are incorporated herein by reference, and in which.

DETAILED DESCRIPTION

Information recording apparatus in accordance with the present invention includes an encoded paper, an imaging pen and a recording/processing unit. The encoded paper is passive and is encoded with a pattern of pixels which contain absolute position information. The pixels include bit locations which are printed with infrared inks that are invisible to the human eye.

The pen comprises a writing instrument, such as a fountain pen or other writing instrument having a fountain pen configuration. The pen also includes all or part of an imaging system to illuminate the pixels near the point where the pen tip contacts the encoded paper and to provide image signals representative of images of the illuminated pixels. The pen can be moved at speeds of up to 4-7 inches per second. The imaging system may comprise a light source and a video camera, each of which can be located in the pen or in the recording/processing unit. When the light source or the video camera is located in the recording/processing unit, it is optically connected to the pen through optical fibers. Alternatively, the pen can be detached from the recording/processing unit, with wireless RF or optical communication of the image signals to the recording/processing unit.

The recording/processing unit includes a computer for processing the image signals to obtain position information, for recording the position information and for controlling communication with a host computer, a memory for storing the position information and a communication link for communicating with the host computer. The recording/processing unit may include the light source and/or the video camera. The imaging system provides image signals representative of images of the pixels near the pen tip as the pen is moved. As the pen passes over the pattern of pixels and provides image signals to the computer, the computer analyzes the image signals to determine the coordinates of the pen positions and stores the coordinates of the pen positions in the memory.

The information recording apparatus of the present invention is designed for field or office use and may be used by sales or mobile personnel, mobile managers, students taking lecture notes, and the like. In a preferred embodiment, the encoded paper can be made in multisheet pads and can be made as a form or as blank paper, with or without visible reference lines. The position information stored in the recording/processing unit may be accessed at any time for display and printout.

Figure 1:
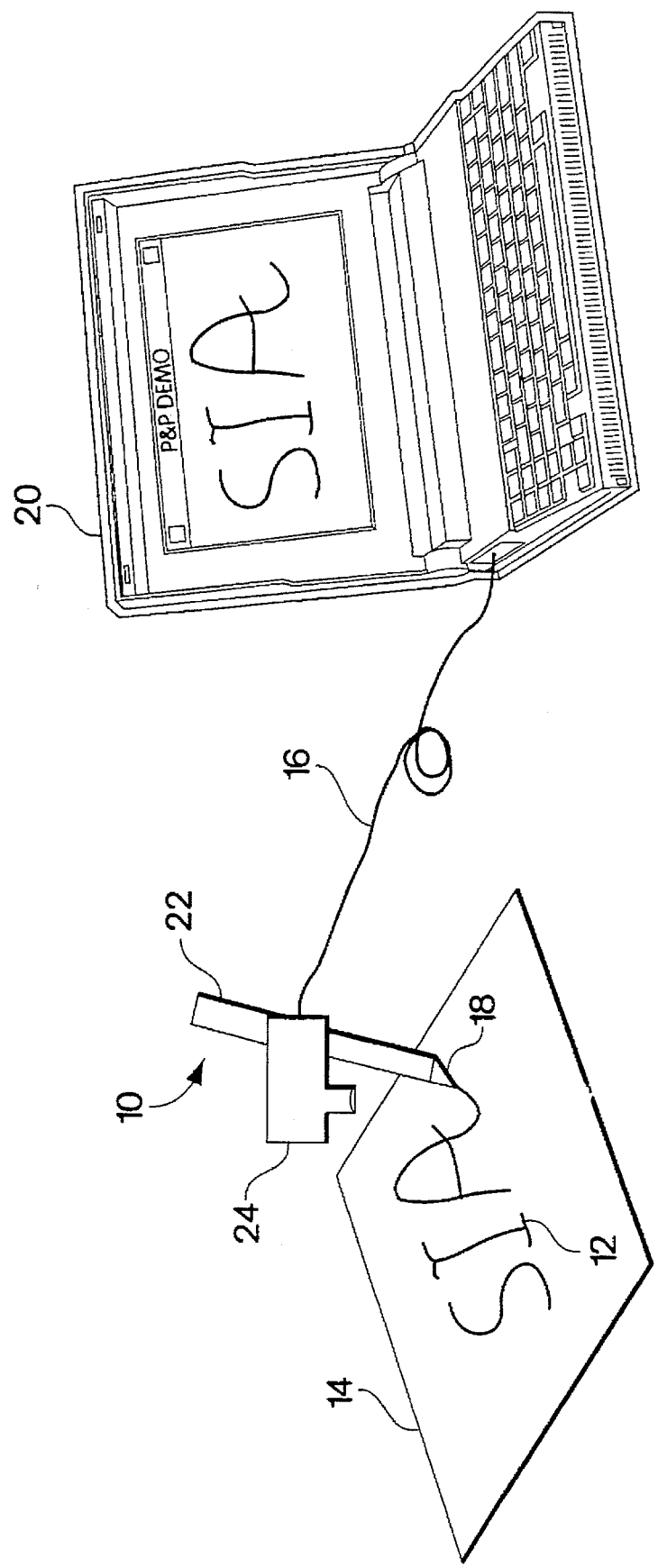
FIG. 1 is a pictorial representation of the information recording apparatus of the present invention.

A pictorial diagram of the information recording apparatus of the present invention is shown in FIG. 1. A pen 10 is used for making visible markings 12 on an encoded paper 14. The pen is typically connected by a cable 16, which may include optical fibers and/or electrical conductors, to a recording/processing unit 20. The pen 10 includes a writing instrument 22, such as a fountain pen, and an imaging system 24, such as a video camera. The visible markings 12, which can be handwriting, drawings or any other markings on a writing surface of encoded paper 14 are traced by a writing tip 18 of writing instrument 22. Simultaneously, the absolute positions of the writing tip 18 on the surface of paper 14 are determined from images of a pattern of prerecorded pixels associated with the surface of paper 14. Image signals representative of images of the pixels are transmitted through the cable 16 to recording/processing unit 20, where the image signals are processed to obtain position information. The position information is stored for later use. The recording/processing unit 20 thus contains an electronic representation of the markings 12.

Figure 2:
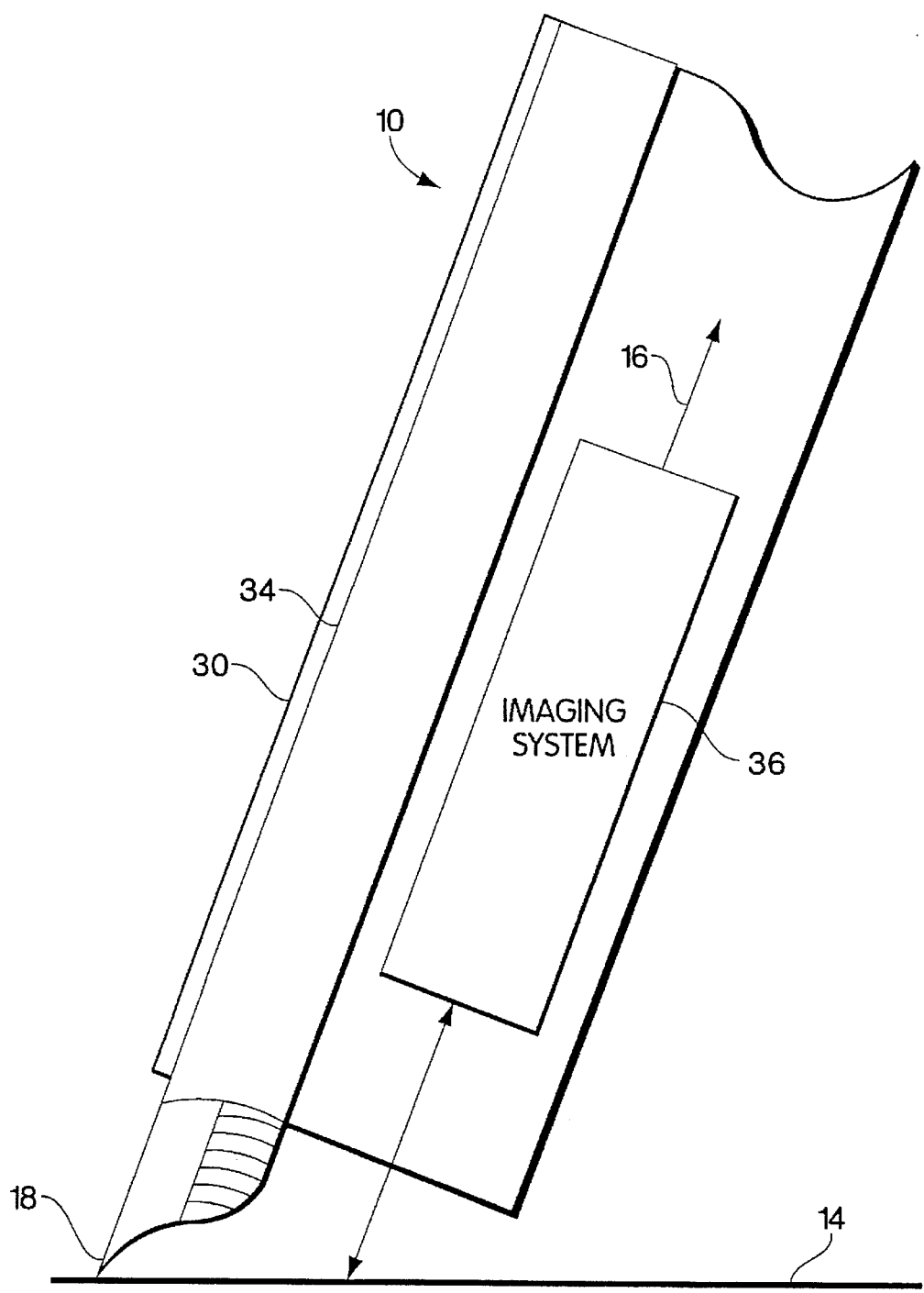
FIG. 2 is a schematic representation of an example of the pen, including the imaging system.

An example of the pen 10 is shown schematically in FIG. 2. Pen 10 includes a housing, or pen body, 30, writing tip 18, as in a conventional fountain pen, an ink cartridge 34 and an imaging system 36. The writing tip 18 channels ink from the cartridge 34 and produces markings on paper 14. Alternatively, any other writing instrument which has a fountain pen configuration can be used for making markings on the encoded paper 14. The imaging system 36 illuminates the encoded paper 14 and provides image signals representative of images of pixels near writing tip 18 as the pen 10 is moved over the paper 14. The imaging system is described in detail below. The pen should be similar in size and shape to conventional writing instruments.

The ink cartridge 34 preferably contains an infrared transparent writing ink for writing on the encoded paper 14. Thus, the markings made by the pen 10 do not obscure the position information contained in the pixels on the encoded paper 14. The cartridge 34 can be filled or replaced. The fountain pen configuration limits the rotational excursion of the pen 10 during writing. By limiting rotation of the pen with the fountain pen configuration, distortion effects due to tilt of the pen axis with respect to the paper surface can be minimized.

Figure 3:
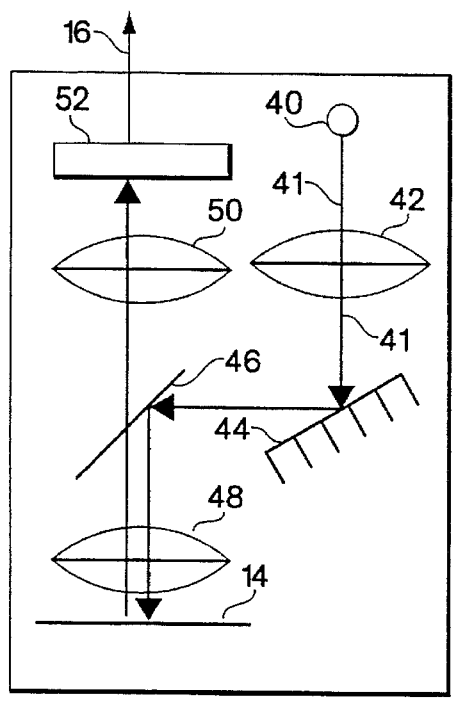
FIG. 3 is a block diagram of a first embodiment of the imaging system.

A block diagram of a first embodiment of the imaging system 36 is shown in FIG. 3. A light beam 41 from a light source 40 is collimated by a lens 42 and is reflected by a mirror 44 to a beam splitter 46. The light beam is reflected by the beam splitter 46 and illuminates pixels on the encoded paper 14. The diffuse reflection from the encoded paper passes through a lens 48 and a lens 50 to a video camera 52, such as a CCD camera. The lenses 48 and 50 magnify the image of the pixels to the size required by the video camera 52. The video camera 52 transmits image signals to the recording/processing unit 20 via cable 16.

The light source 40 can, for example, be a light emitting diode (LED) having an output in the infrared wavelength range. The wavelength of the light source 40 is selected to match the absorption wavelength of the infrared ink used to print the encoded paper 14. The video camera 52 can, for example, be a type commercially available 1/3 inch black and white CCD camera. The embodiment of FIG. 3 uses colinear illumination and detection, with the video camera 52 located on the pen axis.

Figure 4:
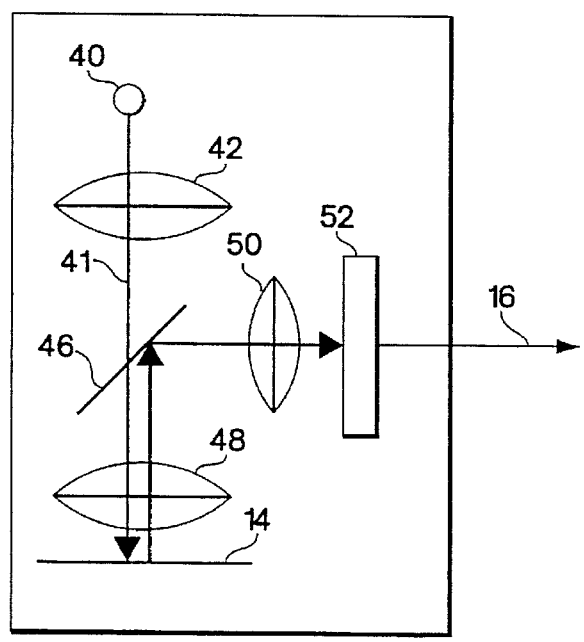
FIG. 4 is a block diagram of a second embodiment of the imaging system.

A block diagram of a second embodiment of the imaging system 36 is shown in FIG. 4. Light source 40 and collimating lens 42 are located on the pen axis. Light beam 41 from source 40 illuminates the pixels on encoded paper 14 through beam splitter 46. The reflection from encoded paper 14 passes through lens 48 and is reflected by beam splitter 46 through lens 50 to video camera 52. In the embodiment of FIG. 4, the optical axis of video camera 52 is perpendicular to the pen axis. This configuration may provide an advantage in packaging the video camera 52 in the pen 10.

Figure 5:
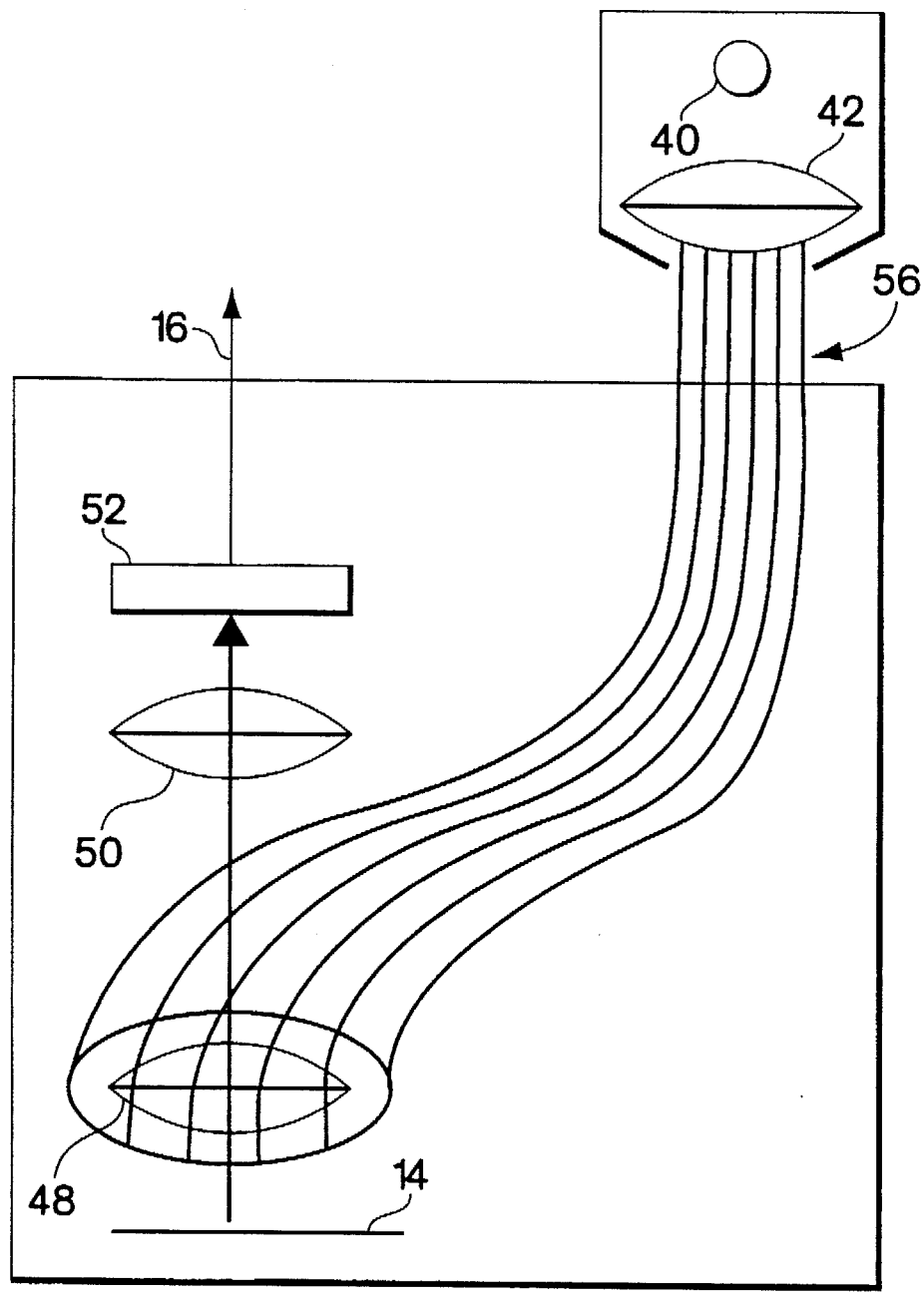
FIG. 5 is a block diagram of a third embodiment of the imaging system.

A block diagram of a third embodiment of the imaging system 36 is shown in FIG. 5. Light source 40 directs light through collimating lens 42 to an optical fiber bundle 56. The optical fibers of bundle 56 are arranged in a circular ring at their output ends adjacent to encoded paper 14 so as to provide uniform illumination of a relatively large area of the encoded paper 14. The light source 40 can be located in the recording/processing unit 20, thereby facilitating packaging of the pen 10. When the light source 40 is located in recording/processing unit 20, the optical fiber bundle 56 is carried in cable 16 (FIG. 1). The reflection from encoded paper 14 passes through lenses 48 and 50 to video camera 52.

Figure 6:
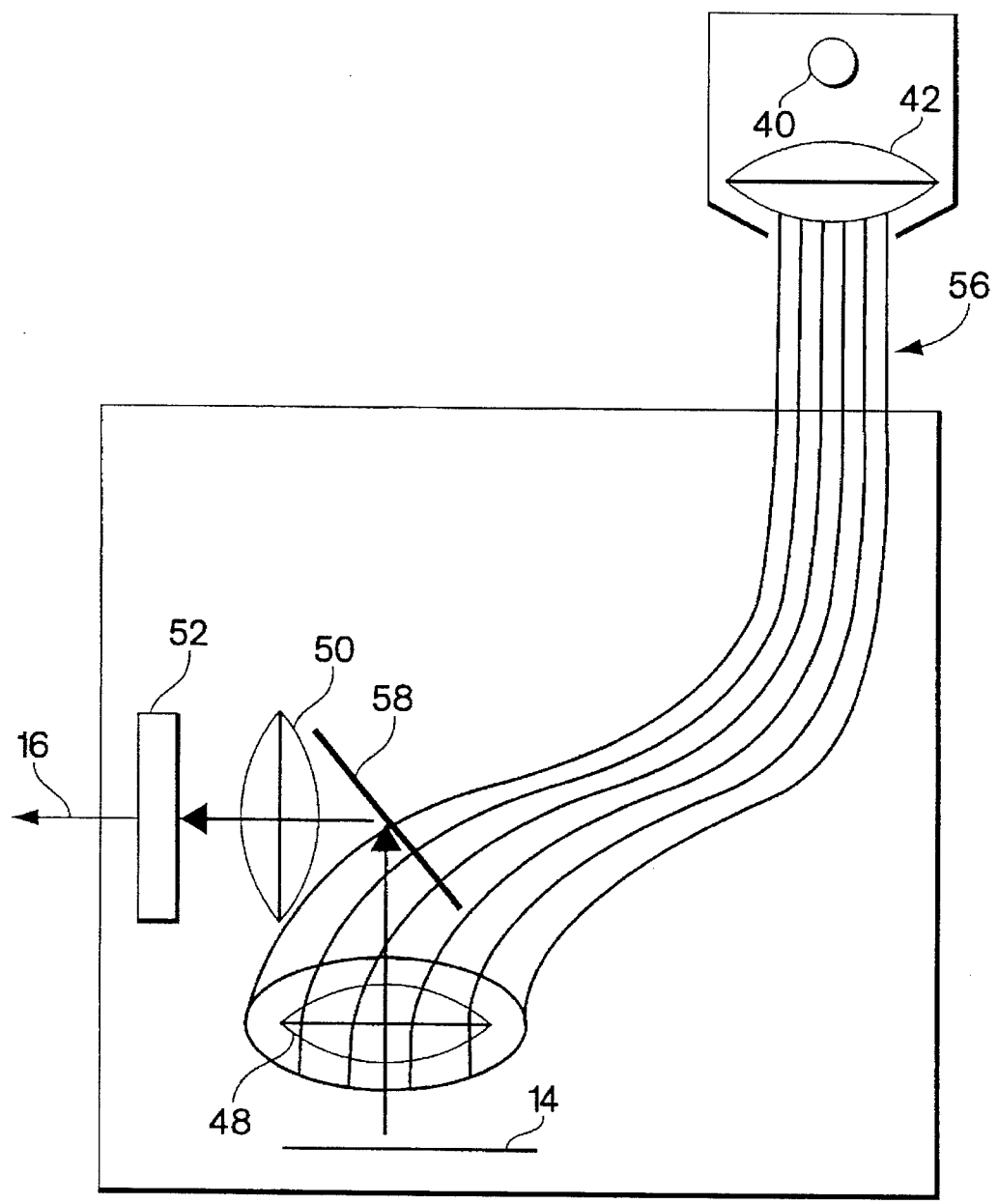
FIG. 6 is a block diagram of a fourth embodiment of the imaging system.

A block diagram of a fourth embodiment of the imaging system 36 is shown in FIG. 6. Light from source 40 is transmitted through optical fiber bundle 56 to the surface of encoded paper 14. The reflection from encoded paper 14 passes through lens 48 and is reflected by a mirror 58 and then passes through lens 50 to video camera 52. In the embodiment of FIG. 6, the light source 40 can be located in the recording/processing unit 20, and the video camera 52 can be mounted normal to the pen axis.

Figure 7:
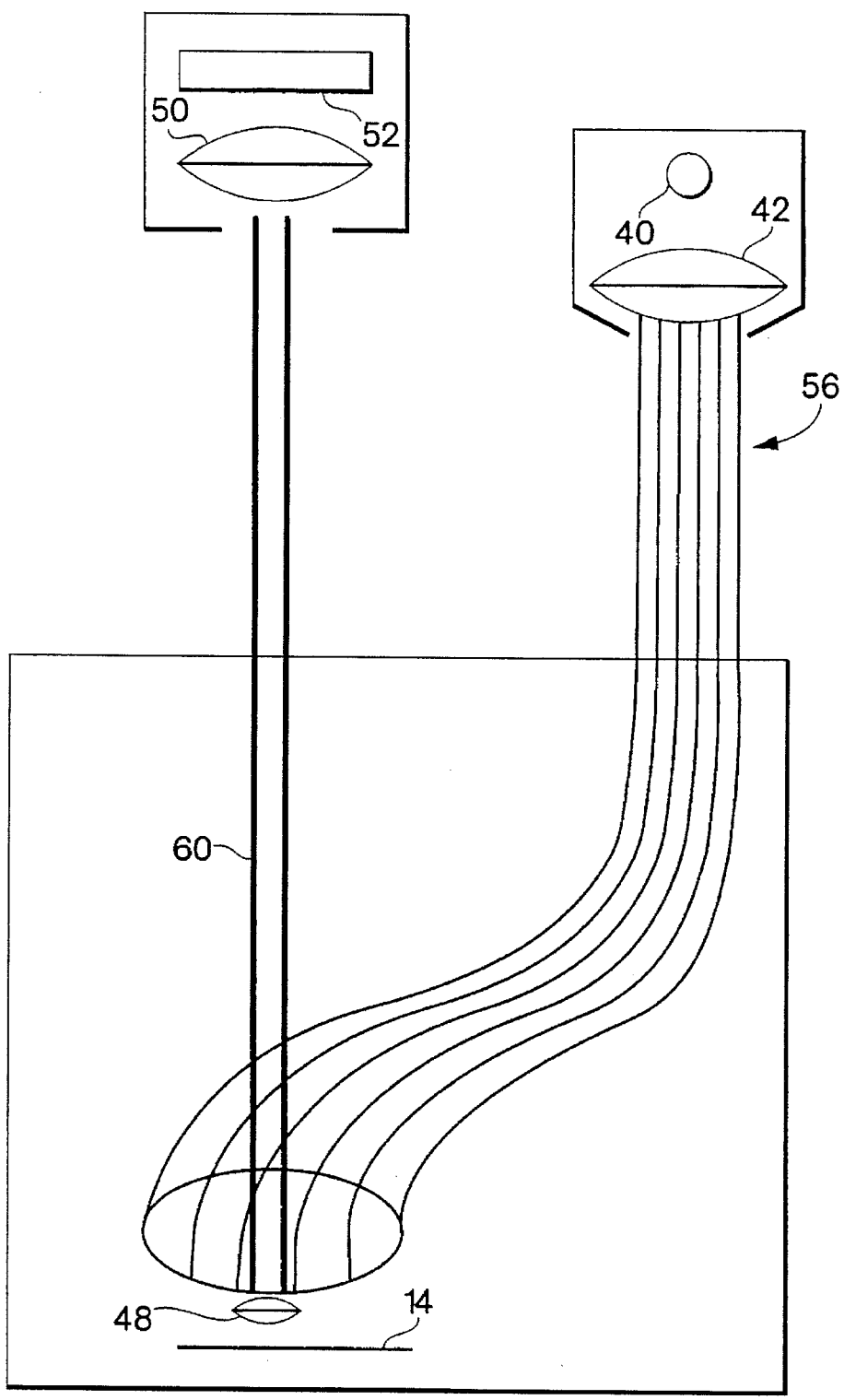
FIG. 7 is a block diagram of a fifth embodiment of the imaging system.

A block diagram of a fifth embodiment of the imaging system 36 is shown in FIG. 7. Light from source 40 is transmitted through collimating lens 42 and optical fiber bundle 56 to surface of encoded paper 14. The reflection from encoded paper 14 passes through lens 48 to a coherent optical fiber bundle 60, which transfers the image of encoded paper 14 through lens 50 to video camera 52. The coherent optical fiber bundle 60 can be carried in cable 16 to recording unit 20. The embodiment of FIG. 7 has the advantage that both the light source 40 and the video camera 52 can be located in the recording/processing unit 20, thus facilitating packaging of the pen 10.

As is apparent from imaging system embodiments shown in FIGS. 3–7 and described above, the imaging system may be located entirely within the pen. Alternatively, a first portion of the imaging system may be located in the pen 10 and a second portion of the imaging system may be located in the recording/processing unit 20. The imaging system is configured to illuminate the pixels near the writing tip 18 and to record a series of images of the pixels as the pen is moved over the encoded paper 14 during writing.

The light source 40 illuminates a field of view of at least 3 by 3 pixels on the encoded paper 14. The illumination light is reflected from different regions of the paper, depending on whether or not the region is printed with an ink that absorbs the light of the illuminating wavelength. As noted above, the illuminating wavelength is preferably in the infrared range. The lenses 48 and 50 insure that the video camera 52 obtains an image that is at least 3 by 3 pixels so that one complete pixel is always included within the image. The frame rate of the video camera 52 is selected to insure reliable operation at pen speeds of up to about 4 to 7 inches per second. This requires a frame rate of between 80 and 100 frames per second.

Other parameters of the pen include field of view, resolution, depth of field, magnification, working distances, and illumination. The field of view should contain 3 by 3 paper pixels, which is a square area of 5.5 mm on a side for the preferred pixels described below. The resolution requirement is set by the smallest feature in the paper pixel code, which is 150 micrometers in the preferred pixels. When the imaging system is tilted with respect to the normal to the paper, the distance between front end of the optics and the object changes, which in turn defocuses the image. This requires a minimum depth of field of 5.000 mm corresponding to a 45° tilt with respect to the normal to the paper and a distance between the pen tip and the center of the optics equal to 5 mm. The magnification is determined by the size of the particular CCD camera used. The image should fill the working area of the detector. A lower limit on magnification can be set by requiring that at least 5 camera pixels should image the smallest feature in the paper pixel. Thus, for a CCD camera with a pixel pitch of 9.6 µm, the minimum required magnification is 0.32. With this information, the working (object and image) distances are adjusted accordingly. A distance of 5 mm is practical for the object distance. The object (paper) is illuminated by a light source emitting at a wavelength of 790 nm, when the preferred infrared ink described below is used on the encoded paper 14. The diffuse scattering from the object is detected by the CCD camera through the optics. Thus, there should be minimum losses at 790 nm by absorption and reflection in all the optical elements used in the module. The appropriate light intensity depends on the particular CCD camera used. A typical value of 2 Lux (or lum/m$^2$) is desirable. The illumination should be relatively uniform over the entire field of view.

As noted above, the encoded paper has a prerecorded pattern of pixels which contain encoded position information. The encoded position information permits the absolute position of the pen tip 18 to be determined by the imaging system 36 simultaneously with writing. A continuous record of the path followed by the pen tip 18 is stored in recording/processing unit 20. The path is specified in terms of the coordinates of the pixels on the encoded paper 14. Preferably, the pattern of pixels is a uniform X-Y grid pattern, including rows and coles of pixels.

Figure 8:
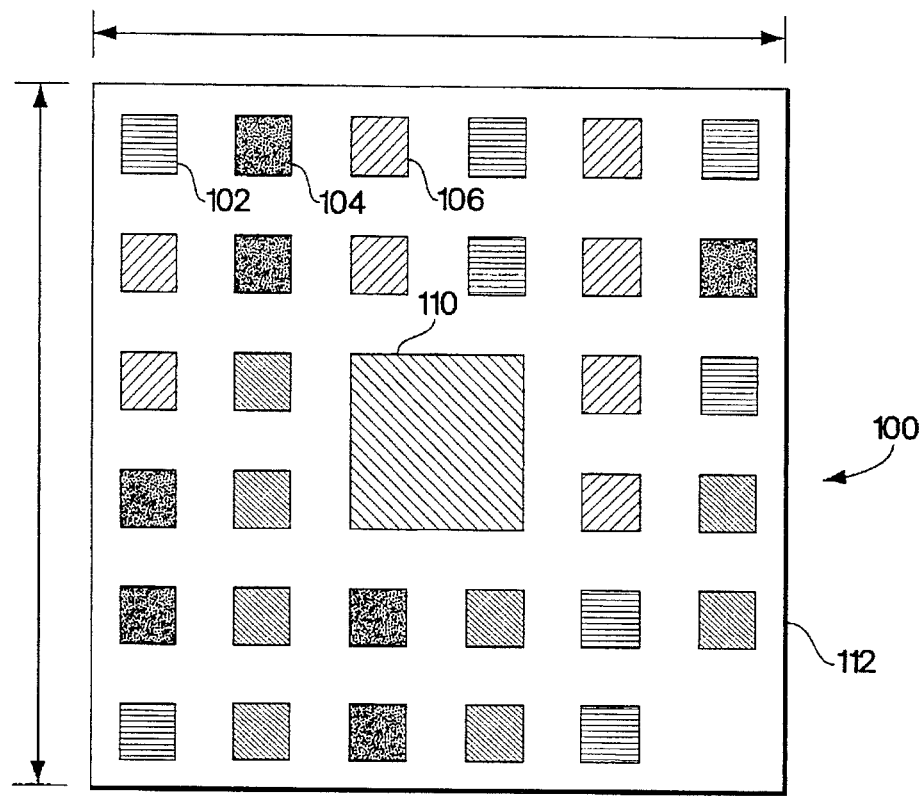
FIG. 8 is an enlarged representation of an example of a pixel used on the encoded paper.
Figure 9:
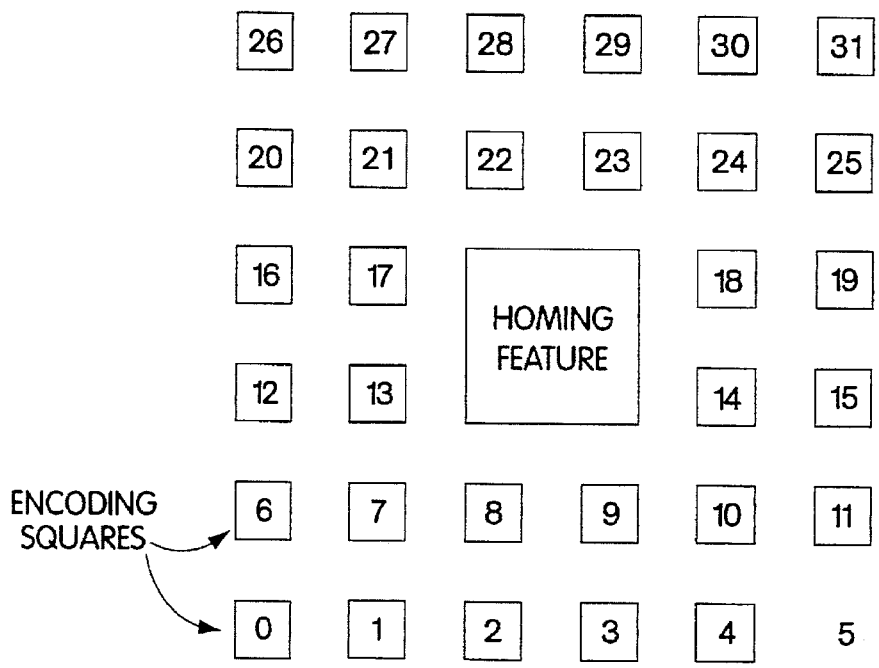
FIG. 9 illustrates the bit assignments of the pixel.

A single pixel 100 is illustrated in FIG. 8. Bit location numbers for the pixel 100 are illustrated in FIG. 9. The pixel includes a plurality of bit locations 102, 104, 106, etc. in an array of rows and columns. Each bit location preferably has a square configuration and contains a single binary bit represented by the presence or absence of an infrared ink. As shown in FIG. 8, the square bit locations, or "encoding squares", are spaced apart and are arranged in rows and columns. A homing feature 110 is located at the center of the pixel 100. The bit locations preferably all have the same size, and the homing feature 110 is larger than the bit locations. In a preferred embodiment, the pixel 100 has 6 square bit locations along each axis, with a total of 32 bit locations each having dimensions of 0.15 millimeter (mm) on a side, a single homing feature having dimensions of 0.45 mm on a side, and a spacing between bit locations of 0.15 mm, with overall pixel dimensions of 1.8 mm on a side. It is noted that a pixel boundary 112 is shown in FIG. 8 for illustrative purposes, but is not printed on the encoded paper 14.

In addition to the homing feature 110 at the center of pixel 100, the pixel 100 includes encoded X and Y coordinate information, pixel orientation information, and may include additional information, such as page number and pad number. In a preferred embodiment, 8 encoding squares are reserved for the X-coordinate of the pixel on the paper, 8 encoding squares are reserved for the Y-coordinate of the pixel on the paper and 4 encoding squares are reserved for pixel orientation. The remaining encoding squares are reserved for page or pad number, or any other desired information. A preferred assignment of bit locations is shown in Table I below. It will be understood that different encoding square assignments can be utilized. Furthermore, the additional encoding squares can be used to specify X and Y coordinates, with fewer encoding squares reserved for page or pad number.

TABLE I

| Encoding square | Assignment |
| --- | --- |
| 0, 5, 26, 31 | pixel orientation |
| 1, 3, 7, 9, 11, 13 15, 17, | X-coordinate of pixel on paper |
| 14, 16, 18, 20, 22 24, 28, 30 | Y-coordinate of pixel on paper |
| 2, 4, 6, 8, 10, 12 19, 21, 23, 25, 27, 29 | page or pad number, or other information |

The position of a pixel is its coordinate in paper Cartesian space. The top left corner of the paper is arbitrarily designated as the origin. The pixel at the origin may be encoded as X=0 and Y=0, or any offset from the origin. All pixels are offsets from the origin. Using 8 bit locations each for X and Y coordinates, 256 pixels can be encoded along each axis. For pixels with dimensions of 1.8 mm on a side, the maximum paper size is 18.14 inches on a side.

When an image is obtained by the imaging system 36, the paper pixel may appear at an angle with respect to the horizontal axis of video camera 52. To determine the rotation, orientation information is embedded in the pixel design. Three squares are used to embed orientation information in a pixel. These orientation squares are placed at the three corners of the pixel, and one corner is left blank. In FIG. 9, the blank corner is encoding square 5. If the pixel is rotated, for example, by 90° about an axis perpendicular to the paper plane, encoding square 5 appears in place of either encoding square 0 or 31, and the rotation of the pixel is registered by the decoding technique described below. When encoding square 5 appears at the bottom right corner of the pixel, the image is not rotated. Any other location of encoding square 5 indicates that the image is rotated.

The pixels 100 are preferably printed on blank paper using an offset printing process. The pattern of pixels extends over the entire surface of the paper. Each pixel defines a unique coordinate position on the surface of the paper. The pixels, as illustrated in FIGS. 8 and 9 and described above, are printed with an infrared ink which is invisible to the human eye. A preferred infrared ink is SiNc as described in detail in copending application Ser. No. (Attorney's Docket No. S1081/7002), filed concurrently herewith, which is hereby incorporated by reference.

Figure 10:
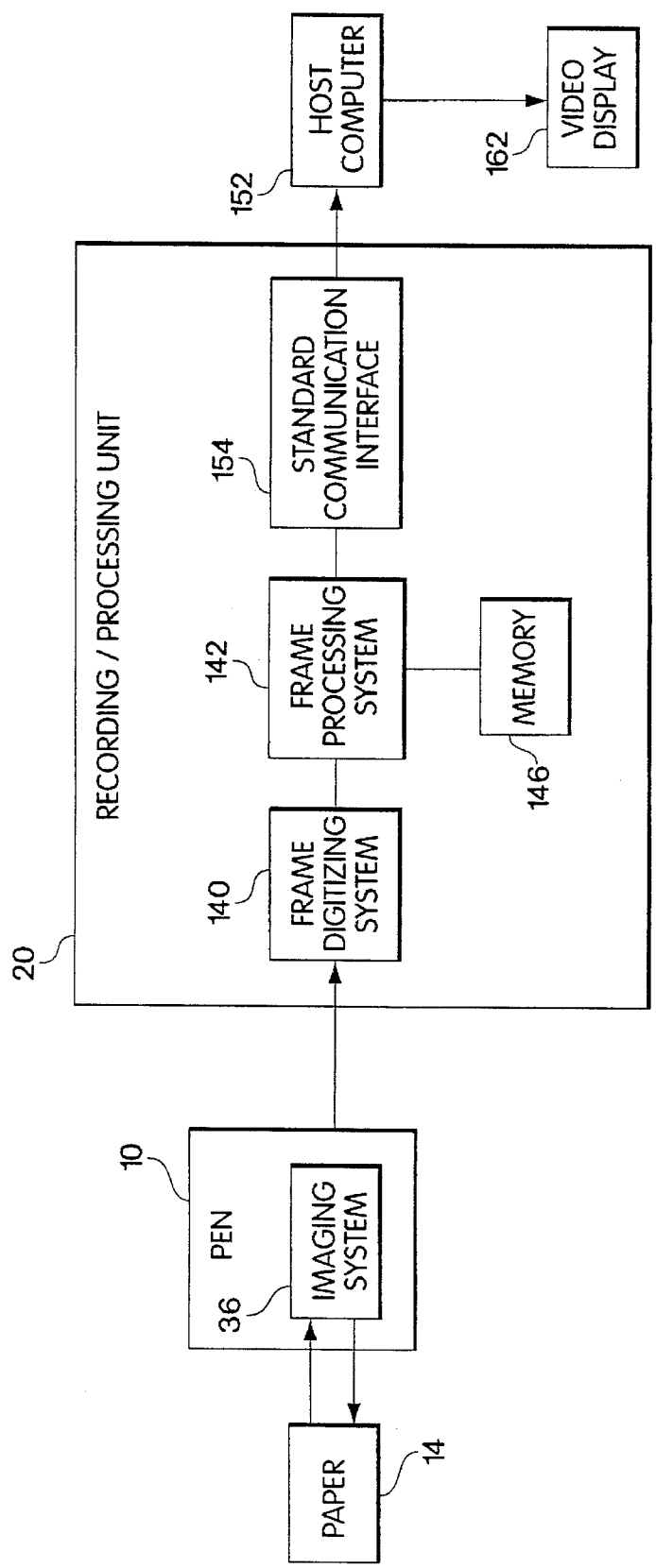
FIG. 10 is a block diagram of the information recording apparatus of the present invention, wherein the recording/processing unit is separate from the host computer.
Figure 11:
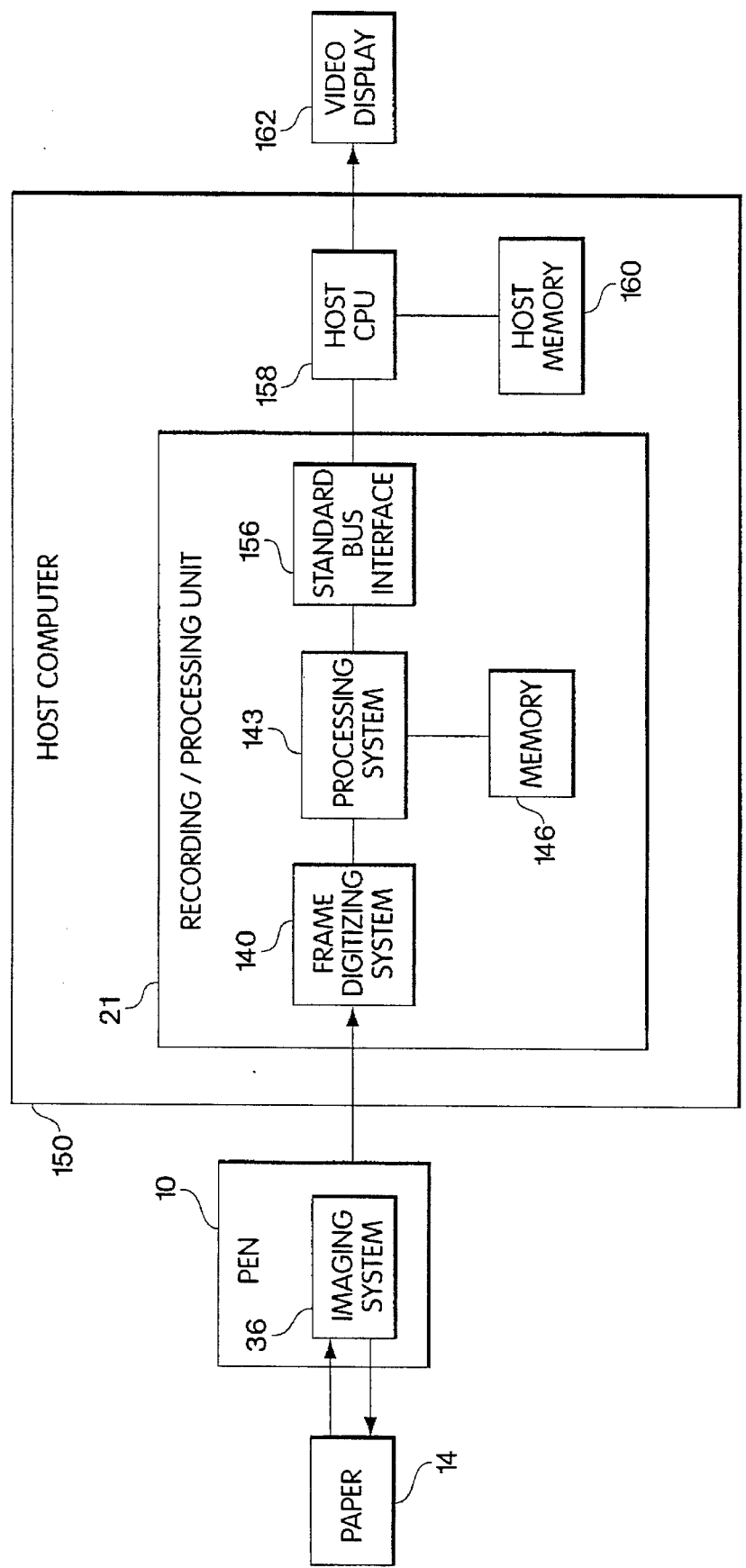
FIG. 11 is a block diagram of the information recording apparatus of the present invention, wherein the recording/processing unit is part of the host computer.

Block diagrams of two embodiments of the information recording apparatus of the present invention are shown in FIG. 10 and FIG. 11. In the embodiment of FIG. 10, the recording/processing unit 20 is an external device connected with a host computer 152 via standard communication interface 154. As described below, all recording and processing tasks are performed by the recording/processing unit 20 and only the position of the pen is outputted to the host computer 152. In the embodiment of FIG. 11, the recording/processing unit 21 is an internal expansion board which plugs into a host computer 150 via standard bus interface 156 and performs partial or total processing of each incoming frame.

Figure 12A:
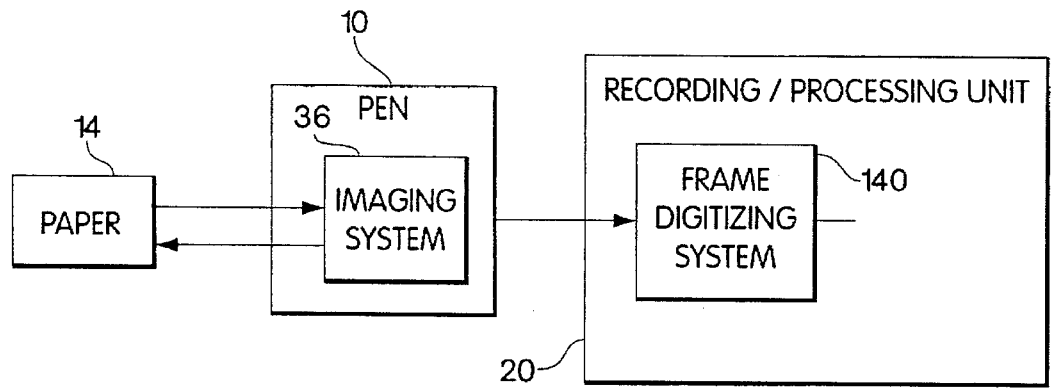
FIG. 12A is a partial block diagram of the information recording apparatus, wherein the camera is located in the pen.
Figure 12B:
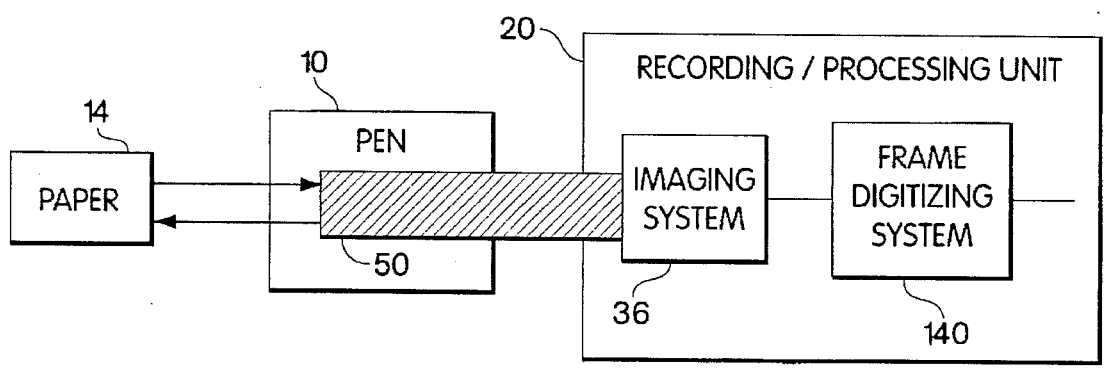
FIG. 12B is a partial block diagram of the information recording apparatus, wherein the camera is located in the recording/processing unit.

In both embodiments, the entire imaging system 36, including the light source and the video camera, is packaged within the pen 10, as shown in FIG. 12A. As described above, the light source and/or the video camera can be located in the recording/processing unit of either embodiment. The recording/processing unit 20 includes a fast frame digitizing system 140 connected through cable 16 to the video camera 52 (see FIGS. 3–7) in the imaging system 36. A memory 146 temporarily stores signals representative of an image obtained by the video camera 52. For writing at the maximum speed on encoded paper 14, the frame digitizing system 140 must obtain between 80 to 100 frames per second. Below is a description of the image acquisition, processing, and decoding steps performed by the two embodiments shown in FIGS. 10 and 11.

In the embodiment shown in FIG. 10, the frame digitizing system 140 digitizes the signal received from the pen 10, which is representative of an image. The digitized image is stored in the memory 146. A frame processing system 142 contains software for analyzing and decoding the image stored in memory 146. The functional blocks (see FIG. 13) of the software are described below. After processing the image, the frame processing system 142 sends the results, which is the position of the pen 10 on paper 14, to the host computer 152 via standard communication interface 154. The communication interface 154 can utilize any suitable communication protocol. The host computer 152 can, for example, be a 386 based computer. The recording/processing unit 20 is required to be connected to the host computer 152 only for data transfer. At other times, the information recording apparatus can operate independently of the host computer 152. When data transfer is desired, the connection is established between the recording/processing unit 20 and the computer 152, and the host computer 152 starts receiving the data transmitted by the recording/processing unit 20. The coordinate data can be displayed, modified, printed, stored or processed in any desired manner by host computer 152.

The embodiment shown in FIG. 10 is different from the embodiment of FIG. 11 in two ways: location of the recording/processing unit and the amount of processing performed by the recording/processing unit. In FIG. 11, the recording/processing unit 21 is an internal device of a computer (in contrast to the external recording/processing unit 20 in FIG. 10), which connects to the computer 150 via standard bus interface 156. The frame digitizing system 140 in the recording/processing unit 21 digitizes the signal received from the pen 10. The signal is digitized as an image and is stored in the memory 146. A processing system 143 may perform only partial image processing and decoding functions. These functions may, for example, include all the functions performed up to step 215 in FIG. 13. The rest of the processing is performed by a host CPU 158 of the host computer 150. A host memory 160 contains the image and support data while the host CPU 158 decodes the image. The results of the processing, the movement of the pen, are displayed on a video display 162.

Figure 13:
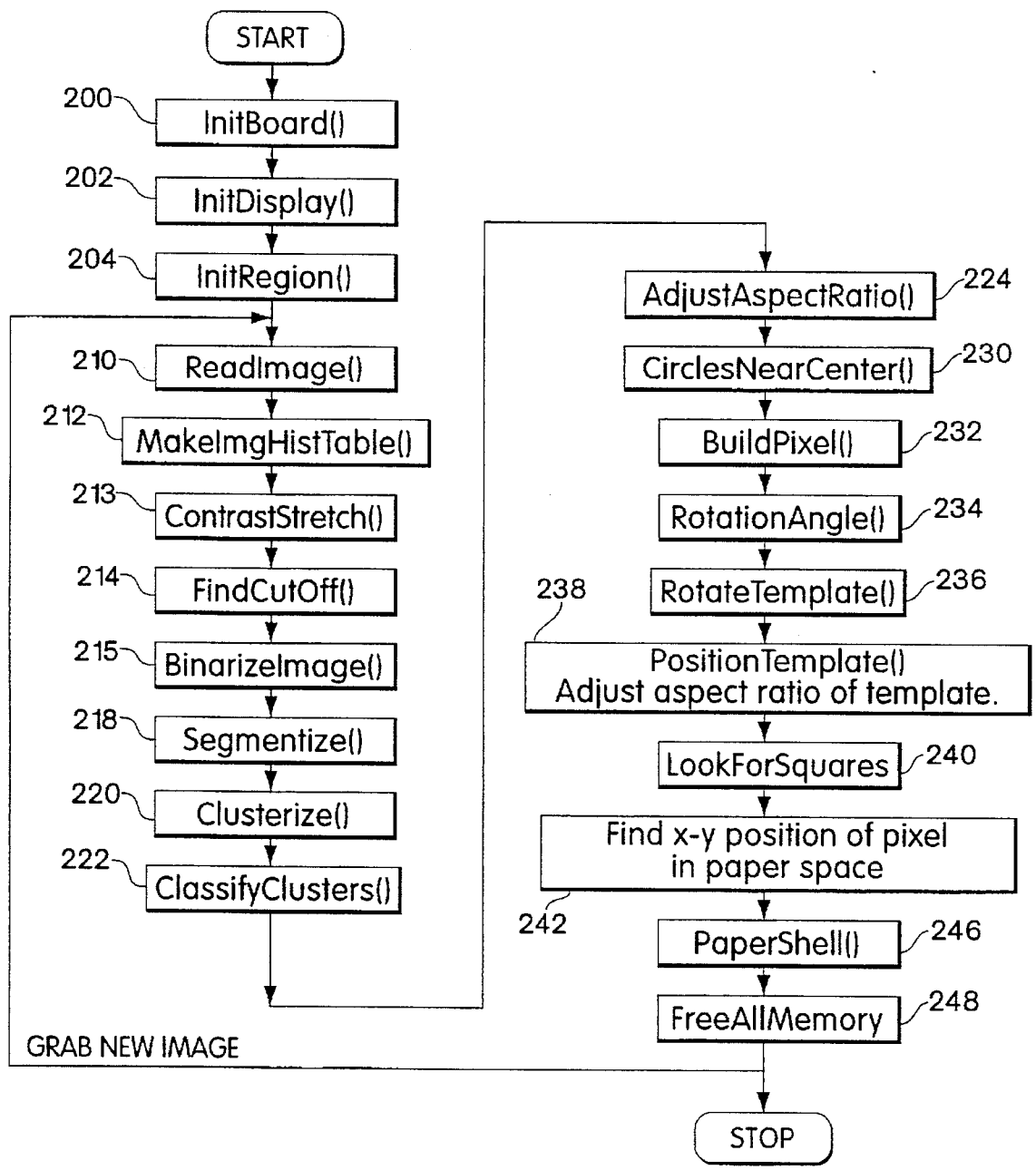
FIG. 13 is a flow diagram of the software for processing the image signals to obtain the position of the writing tip of the pen.

The frame processing system 142 contains software for analyzing and decoding the image data provided by the memory 146 to determine the X and Y coordinates of the tip 18 of the pen 10 as the pen is used to make markings on encoded paper 14. A flow chart of the image processing software is shown in FIG. 13. In general, successive images are analyzed and decoded in a repeating cycle. The cycle starts with the frame processing system initializing and checking the status of the pen 10 and hardware devices on the board (step 200). Step 202 applies only to the embodiment shown in FIG. 11 and is discussed below. A partial region of the image is established (step 204), which is analyzed and decoded by the software during each cycle. This area is called the region of interest. The criterion for the choosing the region of interest is that at least one whole paper pixel must be present in the region. An advantage of this technique is that the decoding process takes a shorter time. The processing described thus far is limited to the region of interest in each image.

The first task of the software cycle is to read an image from the memory 146 (step 210). The image is of size 312×287 camera pixels with 64 gray levels (6 bits). An important step in the software is to classify a pixel as belonging either to the printed pattern of the paper or to the empty white space. The printed area and the white space on the paper are represented by various levels (up to 64) of gray scale pixels in the image. The classification procedure is initiated by establishing a cutoff value to binarize the image (step 215). A cutoff value is calculated in step 214 by first stretching the dynamic range of the image by a contrast enhancement technique (step 213) of normalizing a histogram made in step 212. Then the peak in the histogram, representing the pixel intensity with the largest population, is found. Finally, the cutoff value equals the fraction of the pixel intensity where the histogram peak occurred. The fraction used is a constant calculated by analyzing the histogram of encoded paper of various qualities. A dynamic adjustment is obtained in this manner for the different types of papers used.

A pattern recognition procedure is used to determine if a valid pattern is present in the image. Pattern recognition is done in four steps: segmentation (step 218), clusterization (step 220), classify clusters (step 222), and find the distance between two homing features closest to the center of the image (step 230). After binarizing the image, the clustering algorithm is used to recognize the pattern on the paper. A cluster is a group of pixels that are related to one another by a predetermined measure. Clusters are detected by traversing the image row by row and grouping pixels into segments that lie within a predetermined range. This range is a static threshold called "Gap". The segments are further grouped into clusters by using Gap. Thus a collection of pixels constitutes a segment and a collection of segments is a cluster. The X and Y coordinates of the center of each segment are recorded to calculate the location of the cluster to which it will be assigned.

After detecting clusters, the clusters are classified into two groups: large and small squares. The term "encoding squares" is used to describe the bit locations on the paper and thus in the image. However, the pattern recognition algorithm is shape independent. The classification criteria is based on the size of the cluster. In step 222, the clusters that lie within a predetermined range of sizes are classified as small squares, and a range of larger cluster sizes is used to classify homing features. The homing clusters are 9 times larger in size than the small square clusters that surround it. The homing features and the encoding squares are classified into buffers based on their cluster sizes rather than their geometric shape. Since the CCD video camera has rectangular pixels, the features in the image appear as rectangles. The aspect ratio is determined in step 224 by calculating how many CCD pixels are located between the centers of two horizontally and vertically adjacent paper pixels. The horizontal position of each cluster is corrected with this ratio. Before changing the previous value, it is stored in a separate buffer to be used for displaying the original image.

The paper pixel separation, "Imgdist", is dynamically calculated in step 220 using the distance between the closest homing feature to the center of the image and the second closest. The Imgdist value is used to build a paper pixel template to decode the paper pixel in the image (step 232).

The decoding algorithm consists of five major parts: detecting the homing feature of the paper pixel (step 230), determining the angle by which the paper pixel in the image is rotated with respect to the horizontal axis of the camera (step 234), recognizing the pixel orientation (step 240), and decoding the information stored in the pixel template (step 242).

The homing feature of the paper pixel closest to the center of the image is decoded. The position of the homing feature was calculated while performing the segmentize and clusterize procedures.

The image rotational angle, alpha, is the angle by which the paper is rotated with respect to the camera. This angle must be calculated so that the encoding squares in the paper pixel can be read correctly. The rotational angle is the angle between two centers of adjacent paper pixels and the horizontal axis of the camera. The angle is used to unambiguously locate the camera center on the paper.

The pixel template specifies the positions of encoding squares in a paper pixel relative to the center of the pixel where the homing feature is located. The pixel template is used for sequentially reading the encoding squares of a paper pixel. The template is constructed based on the distance between the centers of two adjacent paper pixels in an image. After constructing the template, it is rotated by the image rotational angle (step 236).

The template must be positioned at the center of the paper pixel being decoded (step 238). This is accomplished by adding the position of the center of the pixel being decoded to each encoding square position in the template. The distance between every encoding square in the template and the encoding square in the image closest to the template square is calculated (step 240). If the distance is less than "SquareDist", a static constant, then the presence of an encoding square at that position is registered. The existence and nonexistence of encoding squares is recorded in a paper pixel template buffer.

After determining the status of each square in the template, the number of blank and filled squares found in place of orientation squares is calculated. For the template to be valid, one blank and three filled encoding squares must be present in the template in the locations of the orientation squares. If the template is found to be invalid based on this condition, then a new image is grabbed, and image processing is repeated for the new image. Otherwise, the position of the orientation square is calculated.

The paper pixel template buffer is examined to determine the position of the orientation square in the paper pixel template (step 242). The square may appear at one of only four positions in the pixel template: position 0, 5, 26 or 31 (see Table 1). The position is recorded, so that it can be used to decode the paper pixel template in the next steps of the decoding software.

The pen position determination procedure calculates the position of the pen tip in paper space. The position is calculated in units of millimeters. The pen tip is at a constant offset from the center of the camera's view. The main issue is to correctly calculate the pen position when the pen tip is stationary and the pen (and thus the camera) is rotated about the optical axis (which is perpendicular to the writing surface). In this case, different images of the pixels on the paper will be obtained, even though the pen tip is stationary. The solution to this problem is explained below.

Thus far the decoding software has determined the following parameters: (1) the position of the homing feature of the paper pixel in the image closest to the center of the camera's view; (2) the position where the blank orientation square appears in the paper pixel template; (3) Imgdist, the distance between the two closest homing features and the center of the camera's view, measured in units of pixels; and (4) alpha, the angle between the line through the centers of two homing features closest to the center of the camera's view and the horizontal axis of the camera.

Since the position of the orientation square in the paper pixel template buffer is known, the position of the encoding squares for the X and Y coordinates in the paper pixel are also known. Hence, the X and Y coordinate encoding squares are used to decode the pixel template to find the position of the paper pixel in the Cartesian paper space.

Figure 14:
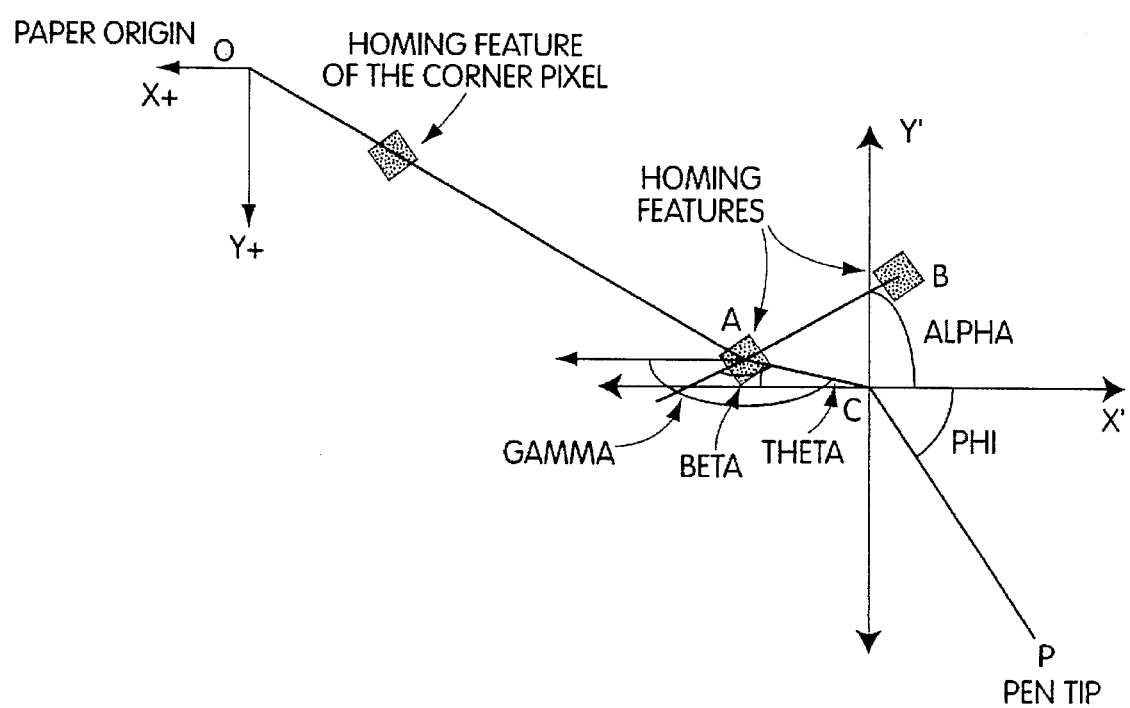
FIG. 14 illustrates the angles and coordinate systems used to find the position of the pen tip on the writing surface.

The following algorithm is used to find the exact location of the pen tip in paper space with respect to the paper origin. The various angles and coordinate systems used to find the position of the pen tip on the paper are shown in FIG. 14. The algorithm is defined below in pseudo code:

Definitions:

A closest homing feature to the center of the CCD

B second closest homing feature to the center of the CCD

C center of the CCD

P pen tip

O origin of the encoding pattern (top-left corner of the printed area of the paper)

ABpix distance between A and B in unit pixels

ACpix distance between A and C in unit pixels

ACmm distance between A and C in units of millimeters

OCx position of the center of CCD in millimeters on the x-axis of the paper

OCy position of the center of CCD in millimeters on the y-axis of the paper

CPmm distance in millimeters between center of CCD(C) and the pen tip (P). This is a constant value.

CPx distance between P and the x-axis of CCD coordinate space (millimeters)

CPy distance between P and the y-axis of CCD coordinate space (millimeters)

OPx distance between P and the x-axis of paper coordinate space (millimeters)

OPy distance between P and the y-axis of paper coordinate space (millimeters)

paperx,y coordinates of paper pixel in paper space orient equals 0, 1, 2, or 3 when orientation square is found at 5, 31, 26, or 0 respectively.

PAPERDIST width of a paper pixel in millimeters

PHI angle between CP and x-axis of CCD coordinate space. (constant)

Algorithm:

Calculate ACpix, given the coordinates of the center of CCD(C) and A in unit pixels.

ACmm=(PAPERDIST*ACpix)/ABpix theta=arctan(ACy/ACx)

beta=π−(AbsoluteValue(alpha)+AbsoluteValue(theta))

gamma=beta+((orient*π)/2)

if (gamma>π) then gamma=gamma−(2*π)

Find the x-coordinate of OC:

OCx=((paperx*PAPERDIST)+(ACmm*cos(gamma)))

Find the y-coordinate of OC:

OCy=((papery*PAPERDIST)+(ACmm*sin(gamma)))

CPx=CPmm*cos(phi−alpha+(orient*(π/2)))

CPy=CPmm*sin(phi−alpha+(orient*(π/2)))

Find the distance of pen tip with respect to the origin of printed area on paper (O):

OPx=CPx+OCx

OPy=CPy+OCy

The above algorithm calculates OPx and OPy. These are the x and y coordinates of the position of the pen tip in paper space in units of millimeters.

Each pen position is checked to determine if it is on the printed area of the paper. The pen tip can be off the paper but the camera can capture a valid image, since the camera is offset from the pen tip. In this event, the above algorithm determines the exact pen tip location with respect to the rotation angle and the image. This location is compared with the dimensions of the printed area on the paper. If the location coordinates are greater than the dimensions of the printed area, the pen tip is off the paper but the camera is obtaining a valid paper pixel.

The pen movement is displayed on the video display 162 (FIG. 10) by drawing lines from one decoded paper pixel to another (step 246). If the system detects that the pen has been lifted from the paper then the chain of pen movement is broken. The status of the pen is categorized as lifted from the paper if the pen tip has gone off the encoded paper, an unsatisfactory image is obtained, or the decoded value of the pixel is unrealistic. The above cycle repeats continuously, each time freeing all the memory reserved by the subroutines and initializing variables (step 248).

While there have been shown and described what are at the present considered the preferred embodiments of the present invention, it will be obvious to those skilled in the art that various changes and modifications may be made therein without departing from the scope of the invention as defined by the appended claims.

What is claimed is:

1. A writing sheet comprising a writing surface and a prerecorded pattern of pixels associated with the writing surface, each of said pixels containing encoded, optically readable position information which identifies an absolute coordinate position of the pixel on said writing surface, said pixel comprising:

a first plurality of bit locations for encoding an X-coordinate of the pixel;

a second plurality of bit locations for encoding a Y-coordinate of the pixel;

a third plurality of bit locations for indicating the orientation of the pixel; and a homing feature for indicating the position of the pixel relative to other pixels, said homing feature being disposed at the center of said pixel and being larger than said bit locations, each of said bit locations containing an optically readable binary bit that is invisible to a human eye, said bit locations comprising spaced-apart squares arranged in a matrix of rows and columns.

2. A writing sheet as defined in claim 1 wherein the dimensions of said square bit locations are substantially equal to the spacing between said bit locations.

3. A writing sheet as defined in claim 1 wherein said pixel further comprises a fourth plurality of bit locations for encoding a page number of said writing sheet.

4. A writing sheet as defined in claim 1 wherein said third plurality of bit locations comprises four bit locations disposed at respective corners of the pixel.

5. A writing sheet as defined in claim 1 wherein each of said optically readable binary bits is defined by the presence or absence of an infrared ink.

6. A writing sheet as defined in claim 1 wherein the bit locations of said first, second and third plurality of bit locations comprise a matrix of encoding squares surrounding said homing feature.

7. A writing sheet as defined in claim 1 wherein said prerecorded pattern of pixels is formed on a surface of a writing paper.

\* \* \* \* \*